US012645998B2

(12) United States Patent
Grady

(10) Patent No.: US 12,645,998 B2
(45) Date of Patent: Jun. 2, 2026

(54) MACHINE LEARNING TRAINING BASED ON DUAL LOSS FUNCTIONS

(71) Applicant: Schlumberger Technology Corporation, Sugar Land, TX (US)

(72) Inventor: Francis Grady, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 516 days.

(21) Appl. No.: 18/259,447

(22) PCT Filed: Dec. 22, 2021

(86) PCT No.: PCT/US2021/073070

§ 371 (c)(1),
(2) Date: Jun. 27, 2023

(87) PCT Pub. No.: WO2022/147410

PCT Pub. Date: Jul. 7, 2022

(65) Prior Publication Data

US 2024/0054398 A1      Feb. 15, 2024

Related U.S. Application Data

(60) Provisional application No. 63/131,589, filed on Dec. 29, 2020.

(51) Int. Cl.
*G06N 3/088*      (2023.01)
*G06N 20/00*      (2019.01)
(52) U.S. Cl.
CPC .................................... *G06N 20/00* (2019.01)

(58) Field of Classification Search
None
See application file for complete search history.

(56) References Cited

U.S. PATENT DOCUMENTS 10,769,766 B1 *  9/2020  Padfield ................ G06T 7/0002
11,409,011 B2 *  8/2022  Hu .......................... G01V 1/282
(Continued)

OTHER PUBLICATIONS

Guillon, Sébastien, et al. "Ground-truth uncertainty-aware metrics for machine learning applications on seismic image interpretation: Application to faults and horizon extraction." The Leading Edge 39.10 (2020): 734-741. (Year: 2020).*
(Continued)

*Primary Examiner* — Polina G Peach
(74) *Attorney, Agent, or Firm* — Kyle R. Miiller

(57)      ABSTRACT

A computer-implemented method for seismic processing includes receiving a seismic training input image, generating, using a first portion of a machine learning model, a first output based at least in part on the seismic training input image, generating, using a second portion of the machine learning model, a second output based at least in part on the seismic training input image, generating a loss function based at least in part on comparing at least two of the first output, a deterministic first label synthetically generated and representing a deterministic ground truth for the first output, the second output, and a non-deterministic second label representing a non-deterministic ground truth for the second output, and refining the first portion, the second portion, or both of the machine learning model based at least in part on the loss function.

23 Claims, 8 Drawing Sheets

(56) References Cited

U.S. PATENT DOCUMENTS

| 11,520,077 | B2* | 12/2022 | Denli | G06N 3/094 |
| 11,625,644 | B1* | 4/2023 | Haramaty | G06F 16/9535 |
| | | | | 707/723 |
| 2012/0296618 | A1* | 11/2012 | Hocker | G01V 20/00 |
| | | | | 703/10 |
| 2018/0130193 | A1* | 5/2018 | Mithal | G06V 10/44 |
| 2019/0302290 | A1* | 10/2019 | Alwon | G01V 1/364 |
| 2020/0088897 | A1* | 3/2020 | Roy | G06N 3/0464 |
| 2020/0183032 | A1* | 6/2020 | Liu | G01V 1/301 |
| 2020/0183047 | A1* | 6/2020 | Denli | G06N 3/094 |
| 2020/0309978 | A1* | 10/2020 | Steffen | G06N 20/00 |
| 2021/0073631 | A1* | 3/2021 | Kadayam Viswanathan | |
| | | | | G06F 18/24155 |
| 2021/0073671 | A1* | 3/2021 | Puri | G06N 5/04 |
| 2021/0181362 | A1* | 6/2021 | Jiang | G06N 3/08 |
| 2021/0223428 | A1* | 7/2021 | Li | G01V 1/345 |
| 2021/0264262 | A1* | 8/2021 | Colombo | G06N 3/09 |
| 2021/0270983 | A1* | 9/2021 | Kaul | G01V 1/302 |
| 2021/0293983 | A1* | 9/2021 | Wei | G01V 1/364 |
| 2022/0018981 | A1* | 1/2022 | Wang | G01V 1/282 |
| 2022/0176917 | A1* | 6/2022 | Phinisee | G08G 1/0967 |
| 2023/0003118 | A1* | 1/2023 | AlTammar | E21B 44/00 |
| 2023/0026857 | A1* | 1/2023 | Di | G01V 1/345 |

OTHER PUBLICATIONS

Search Report and Written Opinion of International Patent Application No. PCT/US2021/073070 dated Feb. 18, 2022, 13 pages.

International Preliminary Report on Patentability of International Patent Application No. PCT/US2021/073070 dated Jul. 13, 2023, 10 pages.

Liu, M. et al., et al., "Seismic facies classification using supervised convolutional neural networks and semisupervised generative adversarial networks", Geophysics, 2020, 85(4), 12 pages.

Xue, Y et al., "SegAN: Adversarial Network with Multi-scale L1 Loss for Medical Image Segmentation", Neuroinform, 2018, 16, pp. 383-392.

Wang, Z. et al., "Distilling Knowledge From an Ensemble of Convolutional Neural Networks for Seismic Fault Detection", IEEE Geoscience and Remote Sensing Letters, 2020, 19(24), 5 pages.

* cited by examiner

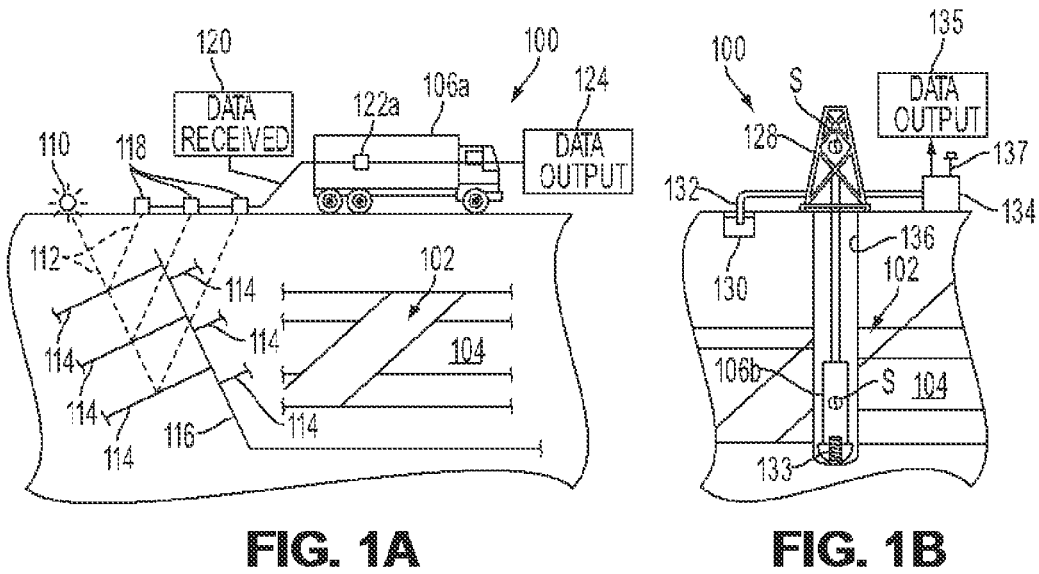
FIG. 1A          FIG. 1B
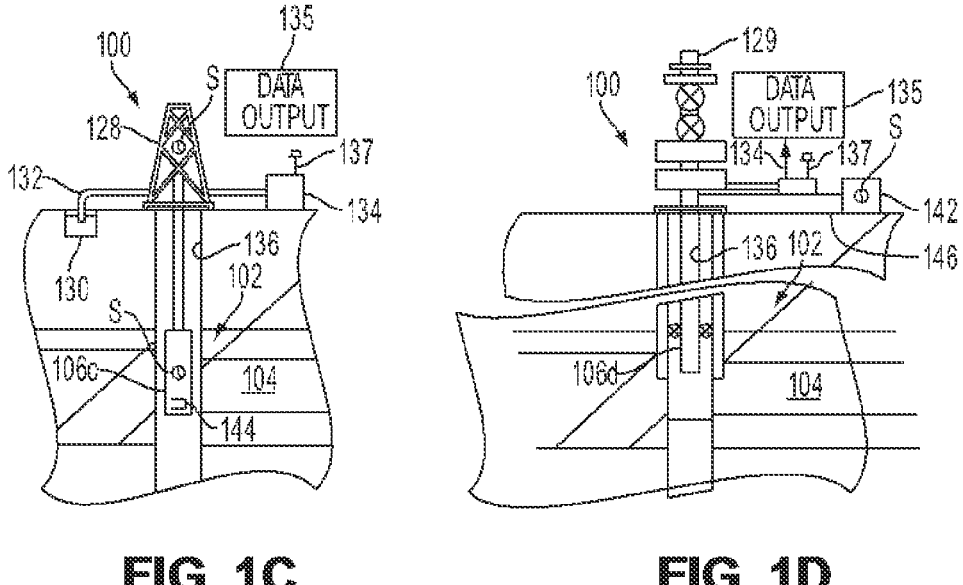
FIG. 1C          FIG. 1D

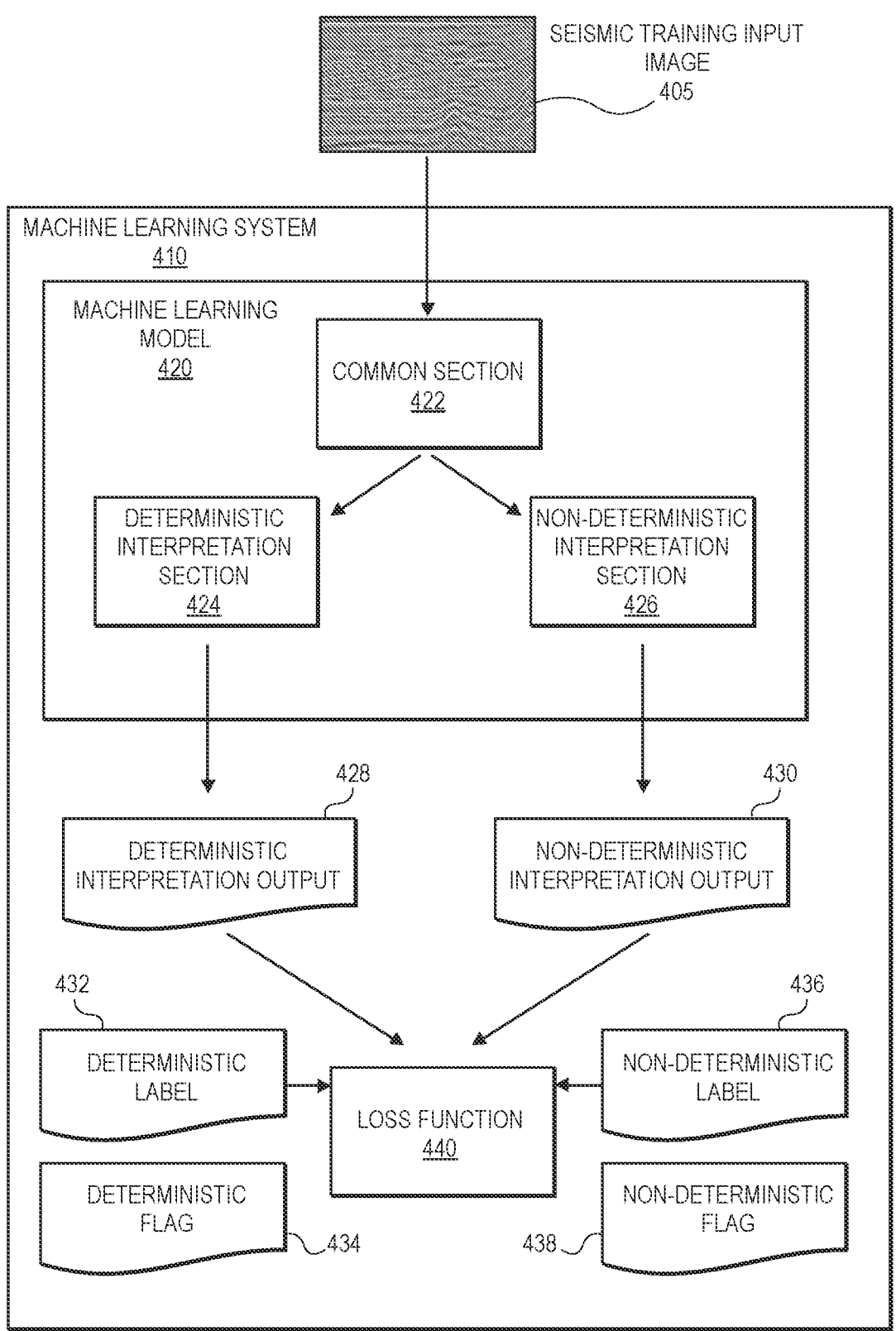

SEISMIC TRAINING INPUT
IMAGE
405

MACHINE LEARNING SYSTEM
410

MACHINE LEARNING
MODEL
420

COMMON SECTION
422

DETERMINISTIC
INTERPRETATION
SECTION
424

NON-DETERMINISTIC
INTERPRETATION
SECTION
426

428

DETERMINISTIC
INTERPRETATION OUTPUT

430

NON-DETERMINISTIC
INTERPRETATION OUTPUT

432

DETERMINISTIC
LABEL

436

NON-DETERMINISTIC
LABEL

LOSS FUNCTION
440

DETERMINISTIC
FLAG

434

438

NON-DETERMINISTIC
FLAG

FIG. 4

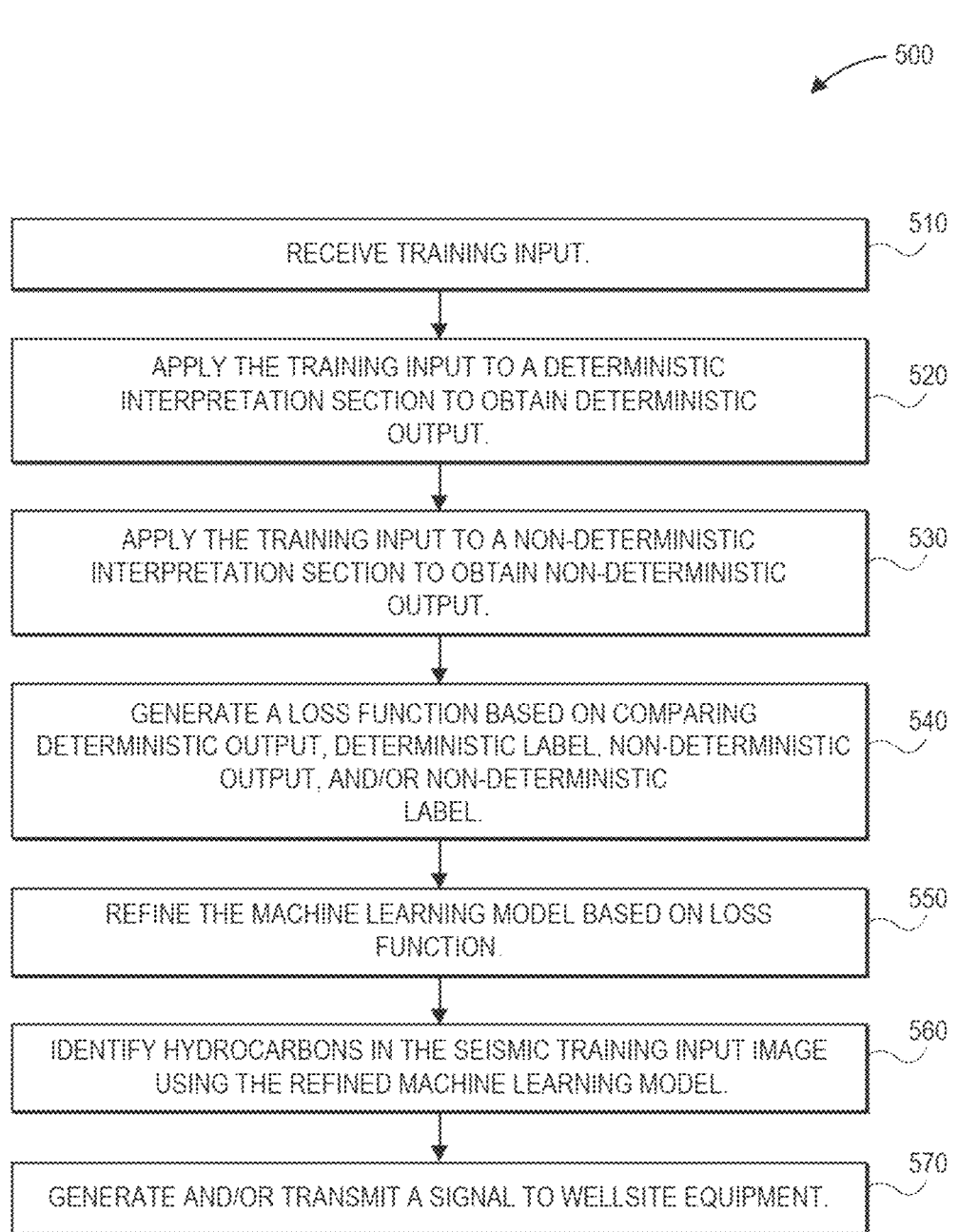

500

RECEIVE TRAINING INPUT.    510

APPLY THE TRAINING INPUT TO A DETERMINISTIC INTERPRETATION SECTION TO OBTAIN DETERMINISTIC OUTPUT.    520

APPLY THE TRAINING INPUT TO A NON-DETERMINISTIC INTERPRETATION SECTION TO OBTAIN NON-DETERMINISTIC OUTPUT.    530

GENERATE A LOSS FUNCTION BASED ON COMPARING DETERMINISTIC OUTPUT, DETERMINISTIC LABEL, NON-DETERMINISTIC OUTPUT, AND/OR NON-DETERMINISTIC LABEL.    540

REFINE THE MACHINE LEARNING MODEL BASED ON LOSS FUNCTION.    550

IDENTIFY HYDROCARBONS IN THE SEISMIC TRAINING INPUT IMAGE USING THE REFINED MACHINE LEARNING MODEL.    560

GENERATE AND/OR TRANSMIT A SIGNAL TO WELLSITE EQUIPMENT.    570

FIG. 5

MACHINE LEARNING TRAINING BASED ON DUAL LOSS FUNCTIONS

CROSS-REFERENCE TO RELATED APPLICATIONS

This application is a National Stage Entry of International Patent Application No. PCT/US2021/073070, filed on Dec. 22, 2021, which claims priority to U.S. Provisional Patent Application No. 63/131,589, filed on Dec. 29, 2020, the entirety of which is incorporated by reference herein.

BACKGROUND

Seismic interpretation involves inferring geology of an area at a depth from a processed seismic record. A seismic record may contain the time of arrival of any reflection (or refraction) from a geological surface. The actual depth to this surface is a function of the thickness and velocity of overlying rock layers. Further, the seismic record may include the shape of the reflection, which represents how strong the signal is, what frequencies it contains, and how the frequencies are distributed over the pulse. This information can be used to support conclusions about the lithology and fluid content of the seismic reflector being evaluated. Observations made using seismic data can be mapped on a base map, or presented in any variety of manner. Seismic interpretations may be used for a variety of purposes, such as oil/gas exploration planning, drilling operations planning, etc.

Supervised learning is a machine learning task of learning a function that maps an input to an output based on example input-output pairs or labels. Supervised learning infers a function from labeled training data providing a set of training examples. In supervised learning, an individual example can be an input object (e.g., a vector) paired with a desired output value (also called the "supervisory signal"). A supervised learning algorithm analyzes the training data and produces an inferred function, which can be used for mapping new examples.

SUMMARY

Embodiments of the disclosure include a method for generating a model of a subterranean formation. The method includes receiving a seismic training input image, generating, using a first portion of a machine learning model, a first output based on the seismic training input image, generating, using a second portion of the machine learning model, a second output based on the seismic training input image, generating a loss function based on comparing at least two of the first output, a deterministic first label synthetically generated and representing a deterministic ground truth for the first output, the second output, and a non-deterministic second label representing a non-deterministic ground truth for the second output. The method also includes refining the first portion, the second portion, or both of the machine learning model based on the loss function.

Embodiments of the disclosure also include a non-transitory computer-readable medium storing instructions that, when executed by at least one processor of a computing system, cause the computing system to perform operations. The operations include receiving a seismic training input image, generating, using a first portion of a machine learning model, a first output based on the seismic training input image, generating, using a second portion of the machine learning model, a second output based on the seismic training input image, generating a loss function based on comparing at least two of the first output, a deterministic first label synthetically generated and representing a deterministic ground truth for the first output, the second output, and a non-deterministic second label representing a non-deterministic ground truth for the second output. The operations also include refining the first portion, the second portion, or both of the machine learning model based on the loss function.

Embodiments of the disclosure also include a computing system that includes one or more processors, and a memory system comprising one or more non-transitory, computer-readable media storing instructions that, when executed by at least one of the one or more processors, cause the computing system to perform operations. The operations include receiving a seismic training input image, generating, using a first portion of a machine learning model, a first output based on the seismic training input image, generating, using a second portion of the machine learning model, a second output based on the seismic training input image, generating a loss function based on comparing at least two of the first output, a deterministic first label synthetically generated and representing a deterministic ground truth for the first output, the second output, and a non-deterministic second label representing a non-deterministic ground truth for the second output. The operations also include refining the first portion, the second portion, or both of the machine learning model based on the loss function.

Embodiments of the disclosure also include a computing system including means for receiving a seismic training input image, means for generating, using a first portion of a machine learning model, a first output based on the seismic training input image, means for generating, using a second portion of the machine learning model, a second output based on the seismic training input image, generating a loss function based on comparing at least two of the first output, a deterministic first label synthetically generated and representing a deterministic ground truth for the first output, the second output, and a non-deterministic second label representing a non-deterministic ground truth for the second output. The system also includes means for refining the first portion, the second portion, or both of the machine learning model based on the loss function.

Embodiments of the disclosure also include a computing system configured to receive a seismic training input image, generate, using a first portion of a machine learning model, a first output based on the seismic training input image, generate, using a second portion of the machine learning model, a second output based on the seismic training input image, generate a loss function based on comparing at least two of the first output, a deterministic first label synthetically generated and representing a deterministic ground truth for the first output, the second output, and a non-deterministic second label representing a non-deterministic ground truth for the second output. The computing system is also configured to refine the first portion, the second portion, or both of the machine learning model based on the loss function.

The loss function may be based on comparing at least two of the first output, a deterministic first label synthetically generated and representing a deterministic ground truth for the first output, the second output, and a non-deterministic second label representing a non-deterministic ground truth for the second output.

The first portion may be or include a deterministic portion, and the second portion may be or include a non-deterministic portion.

The first output may be or include a deterministic output, and the second output may be or include a non-deterministic output.

The deterministic first label may be generated by applying the seismic training input image to a physical model. The non-deterministic second label may be manually generated by a subject matter expert or interpreter.

Refining the first portion of the machine learning model may be based on the first output and the non-deterministic second label, and not on the second output and the deterministic first label. Refining the second portion of the machine learning model may be based on the second output and the deterministic first label, and not on the first output and the non-deterministic second label.

Embodiments of the disclosure may also include identifying hydrocarbons in a seismic operational input image using the refined machine learning model. Embodiments of the disclosure may also include transmitting a signal to wellsite equipment based upon a location of the hydrocarbons in the seismic operational input image. The signal may instruct the wellsite equipment to drill (e.g., steer) toward the hydrocarbons in a subterranean formation.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 4 illustrates a diagram for training a machine learning model to interpret seismic data images, according to an embodiment.

FIG. 5 illustrates a flowchart of a process of an iteration for training a machine learning model based on deterministic and non-deterministic labels, according to an embodiment.

DESCRIPTION OF EMBODIMENTS

Figure 2:
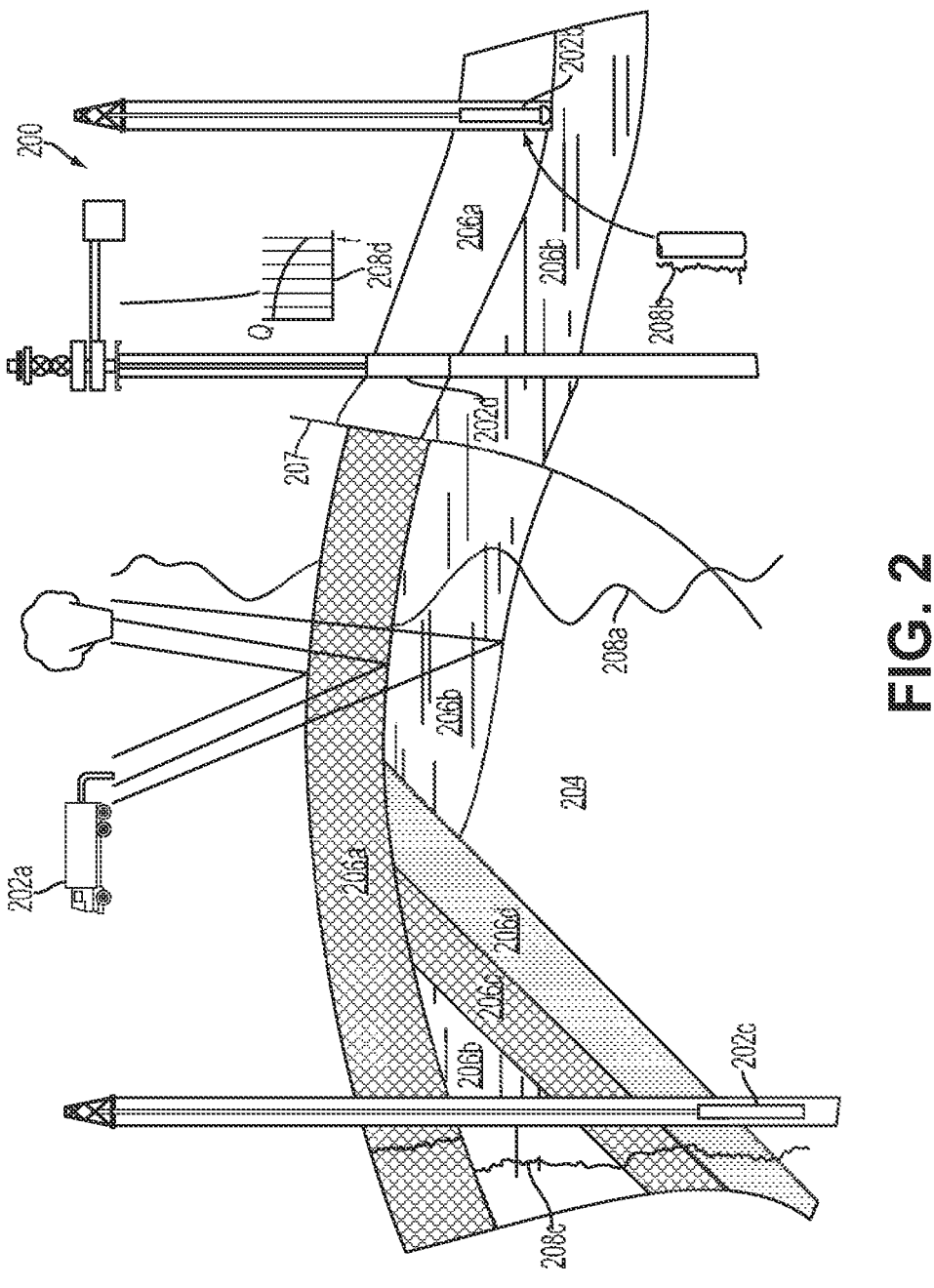

Supervised learning involves training a machine learning system to produce an output based on a given input. In supervised learning, the machine learning system is trained based on training data in which an input is labeled with a pre-determined ground truth label. In some situations, producing a sufficient level of training data may be impractical as doing so would involve pre-determining ground truth labels (e.g., manually) for an inordinate number of input datasets.

As one example, a machine learning system, in accordance with aspects of the present disclosure, may be trained to output an interpretation of a wide variety of input seismic data images. In order to train such a system using standard supervised learning techniques, the machine learning model would be provided with hundreds or thousands of input-output ground truth labels. As noted above, these ground-truth labels may be a result of manual analysis and interpretation of input seismic images. Specifically, the labels represent interpretations of the seismic images by a subject matter expert (SME) interpreter (e.g., interpretations such as fault stick locations, horizon interpretations, salt body boundaries, geobodies, etc.). Such an endeavor is highly time consuming, and may compromise the quality of the machine learning system, as manual interpretations of seismic data may involve non-repeatable, subjective human interpretation, which may include a high degree of "guess-work" and imprecision. For example, an interpretation of a seismic cube may take weeks to months. Given the amount of time taken to perform interpretation, interpreters may interpret sections of data of interest for a given task. For example, faults within a seismic survey may be interpreted within a given depth range, or interpreters may interpret every $10^{th}$ or $20^{th}$ slice of a seismic survey to save time, while other aspects or slices of the survey being omitted from the interpretation.

Accordingly, aspects of the present disclosure may train a machine learning system to interpret wide variety of input seismic data images based on a deterministic set of input training data, thereby reducing the need for manual generation of ground-truth labels. That is, aspects of the present disclosure may deterministically generate ground-truth labels for different input seismic data image sets, and use these input seismic data image sets and ground-truth labels as training data to train a machine learning system. Once the machine learning system is trained, the machine learning system may be used in real-time operation to interpret real-life seismic data images from the field.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
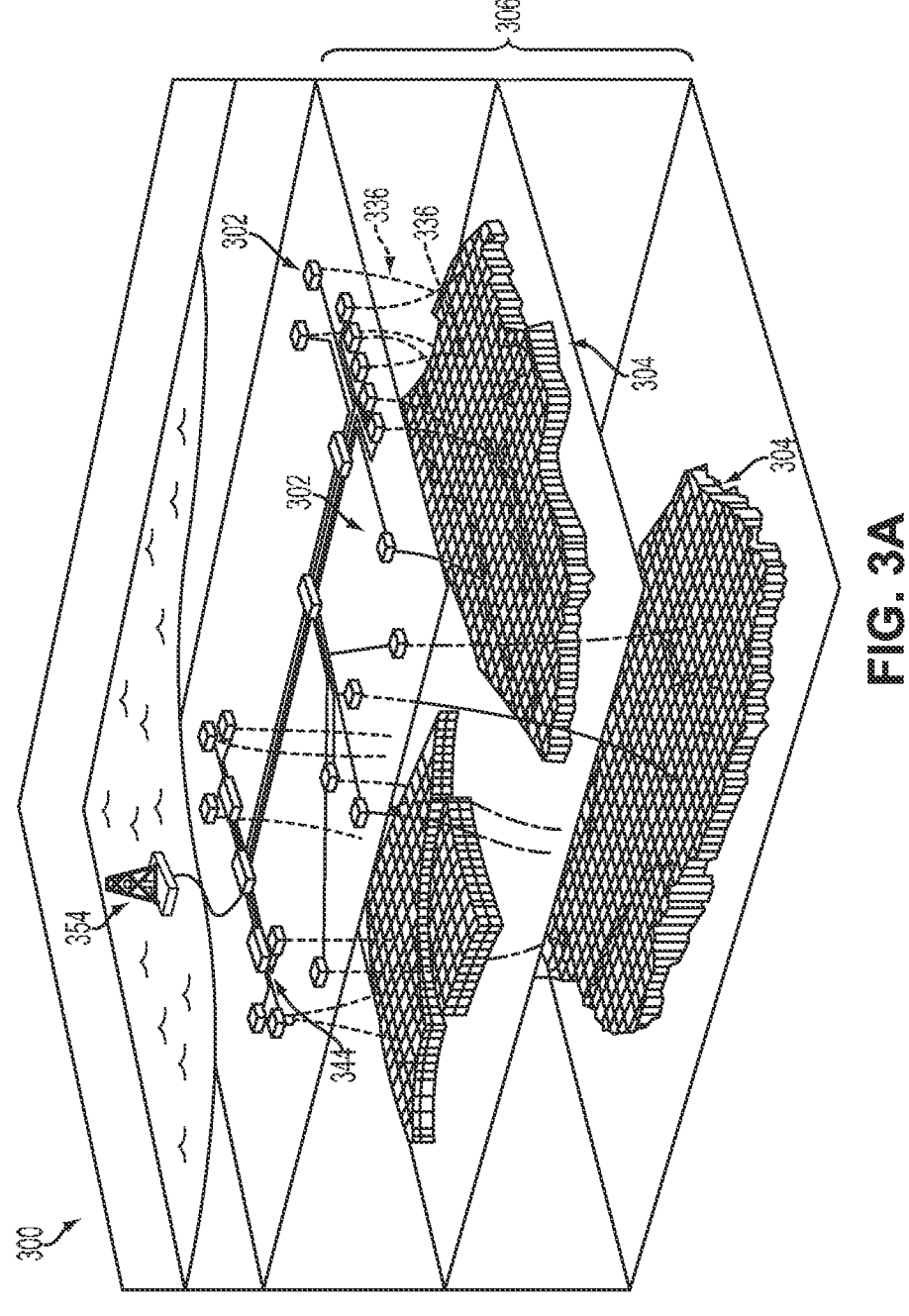

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
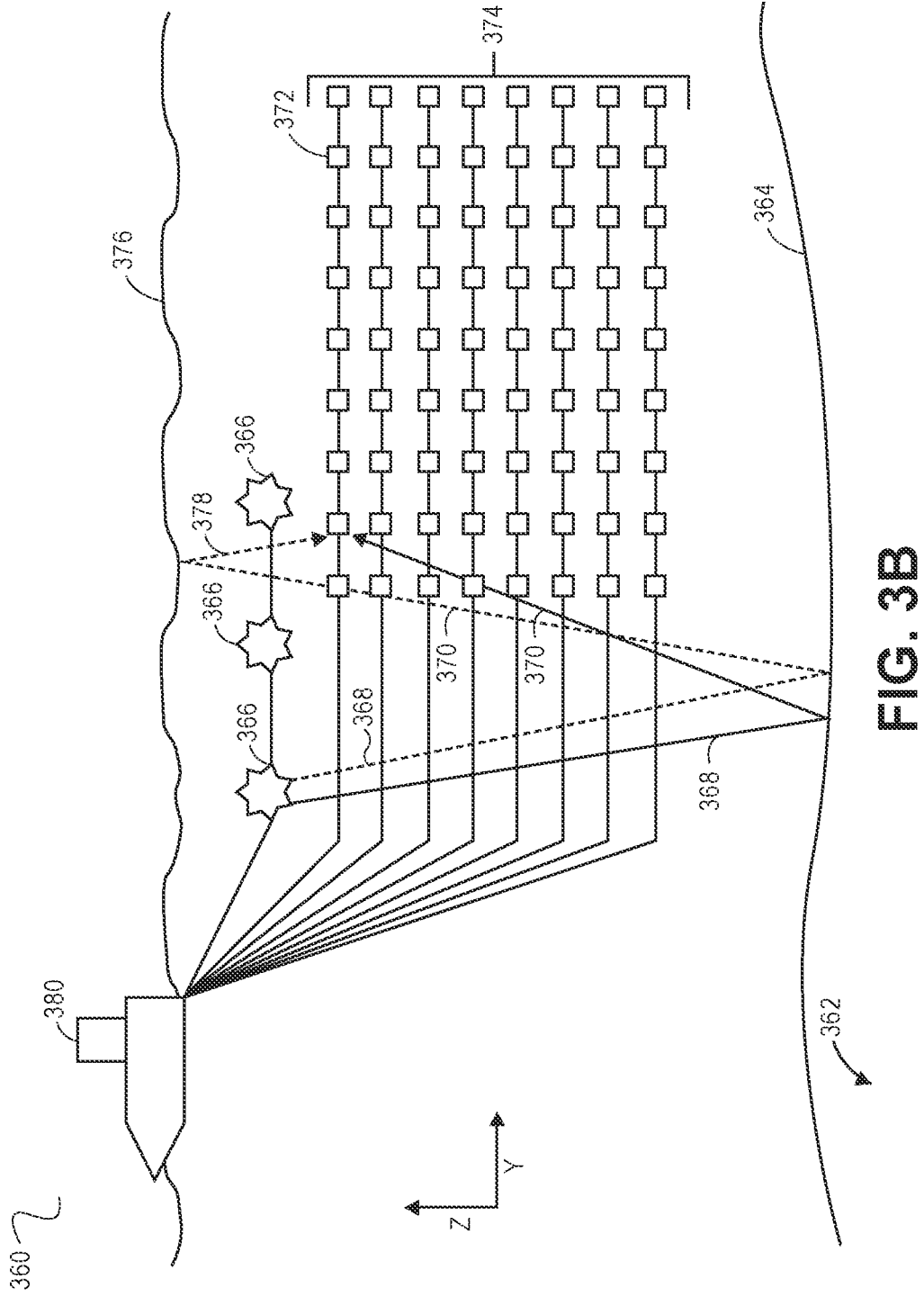

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Machine Learning Training Based on Dual Loss Functions

FIG. 4 illustrates a diagram of a machine learning system 410 for training a machine learning model to interpret seismic data images, according to an embodiment. The machine learning system 410 may implement a machine learning model 420. To train the machine learning model 420 to interpret seismic images, the machine learning model 420 may execute numerous training iterations (e.g., thousands of iterations). In one iteration, the machine learning model 420 may receive a seismic training input image 405. The machine learning model 420 may implement a common section 422 that is split into a deterministic interpretation section 424 and a non-deterministic interpretation section 426. The deterministic interpretation section 424 may be a first portion of a neural network that is trained using a deterministic or algorithmic process (e.g., trained based on deterministically or algorithmically generated interpretation labels using a physical model or other type of model). The deterministic interpretation section 424 may generate a deterministic interpretation output 428 based on the seismic training input image 405. The non-deterministic interpretation section 426 may be a second portion of the neural network that is trained using a non-deterministic process (e.g., trained based on pre-determined or manually generated interpretation labels). The non-deterministic interpretation section 426 may generate a non-deterministic interpretation output 430 based on the seismic data input 405.

In some embodiments, the seismic training input image 405 may be labeled with a deterministic label 432 (e.g., a synthetically or algorithmically generated label of the interpretation based on a physical model or other type of model). A deterministic flag 434 may be stored to indicate that the deterministic label 432 is present for the seismic training input 405. In some embodiments, the deterministic label 432 may be considered to be a "ground-truth" for the deterministic interpretation section 424, as the deterministic label 432 is algorithmically generated based on a computational process using a variety of models.

In some embodiments, the seismic training input image 405 may be labeled with a non-deterministic label 436 (e.g., a manually pre-determined interpretation of the seismic training input 405). In particular, in some embodiments, the label 436 may be considered "non-deterministic" because it is applied by a human user, e.g., a subject-matter expert, rather than automatically by a computer processor applying a model, rules, etc. A non-deterministic flag 438 may be stored to indicate that a non-deterministic label 436 is present for the seismic training input 405. In some embodiments, the non-deterministic label 436 may be considered to be a ground-truth for the non-deterministic interpretation section 426, as the non-deterministic label 436 is a manually generated interpretation.

In some embodiments, the machine learning system 410 may generate a loss function 440 based on the deterministic interpretation output 428, the non-deterministic interpretation output 430, the deterministic label 432, the non-deterministic label 436, or a combination thereof. For example, the loss function 440 may represent a difference between any two or more of the deterministic interpretation output 428, the non-deterministic interpretation output 430, the deterministic label 432, and/or the non-deterministic label 436.

As described herein, in generating the loss function 440, the machine learning system 410 may compare the ground-truth for the deterministic section 424 (e.g., the deterministic label 432) with the output produced by the deterministic interpretation section 424 (e.g., the deterministic output 428). That is, the loss function 440 may represent an error of the deterministic interpretation section 424. Further, in generating the loss function 440, the machine learning system 410 may compare the ground truth for the non-deterministic section 426 (e.g., the non-deterministic label 436) with the output produced by the non-deterministic section 426 (e.g., the non-deterministic output 430). That is, the loss function 440 may represent an error of the non-deterministic interpretation section 426. In some embodiments, the loss function 440 may be used by the machine learning system 410 to adjust weightings of the deterministic interpretation section 424 and/or the non-deterministic section 426 based on the determined errors.

In some embodiments, in generating the loss function 440, the machine learning system 410 may determine an error of the deterministic interpretation section 424 based on a comparison of the non-deterministic label 436 and the deterministic interpretation output 428. In some embodiments, in generating the loss function 440, the machine learning system 410 may determine an error of the non-deterministic interpretation section 426 based on a comparison of the deterministic label 432 and the non-deterministic interpretation output 430.

In some embodiments, the loss function 440 may not factor in the deterministic interpretation output 428 when the deterministic flag 434 is not present (e.g., indicating that the deterministic label 432 is not present). Additionally, or alternatively, the loss function 440 may not factor in the non-deterministic interpretation output 430 when the non-deterministic flag 438 is not present (e.g., indicating that the non-deterministic label 436 is not present).

As described herein, the process shown in FIG. 4 may be repeated for subsequent iterations of the training process using different sets of seismic training input images 405. In this way, the errors of deterministic interpretation output 428 and the non-deterministic interpretation output 430 may approach zero. Also, non-deterministic labels 436 are not employed for every seismic training input image 405 from which the machine learning model 420 is trained, as deterministic labels 432 may be synthetically generated and used to train the machine learning model.

FIG. 5 illustrates a flowchart of a process 500 of an iteration for training a machine learning model based on deterministic and non-deterministic labels, according to an embodiment. The process 500 may be repeated any number of times for separate iterations in which the accuracy of the machine learning model is improved at subsequent iterations. As noted herein, the flowchart illustrates the architecture, functionality, and operation of possible implementations of systems, methods, and computer program products according to various embodiments of the present disclosure.

As shown in FIG. 5, the process 500 may include receiving training input (as at block 510). For example, the machine learning system 410 may receive training input, such as a seismic training input image 405. In some embodiments, the seismic training input image 405 may include a deterministic label 432 that is synthetically generated and/or a non-deterministic label 436 that is manually generated (e.g., by an SME, interpreter, etc.).

The process 500 also may include applying the training input to a deterministic interpretation section to obtain a deterministic output (as at block 520). For example, the machine learning system 410 may apply the seismic training input image 405 to the deterministic interpretation section 424 to obtain a deterministic interpretation output 428. On an initial iteration of the process 500 in which no training has been yet performed, the deterministic interpretation output 428 may be relatively random and have a high degree of error, which may be corrected in subsequent iterations of the process 500 using a loss function, as described in greater detail herein.

The process 500 further may include applying the training input to the non-deterministic section to obtain a non-deterministic output (as at block 530). For example, the machine learning system 410 may apply the training input to the non-deterministic interpretation section 426 to obtain the non-deterministic interpretation output 430. On an initial iteration of the process 500 in which no training has been yet performed, the non-deterministic interpretation output 430 may be relatively random and have a high degree of error, which may be corrected in subsequent iterations of the process 500 using the loss function, as described in greater detail herein. In some embodiments, steps 520 or 530 may be omitted in a situation in which the seismic training input image 405 does not include a deterministic label 432 or a non-deterministic label 436.

The process 500 also may include generating a loss function based on the deterministic output, the deterministic label, the non-deterministic output, and/or the non-deterministic label (as at block 540). For example, the machine learning system 410 may generate the loss function 440 based on one or more of the deterministic interpretation outputs 428, the non-deterministic interpretation output 430, the deterministic label 432, and/or the non-deterministic label 436. In some embodiments, the machine learning system 410 may detect whether a deterministic label 432 exists for the seismic training input image 405 based on the presence of the deterministic flag 434. Similarly, the machine learning system 410 may detect whether a non-deterministic label 436 exists based on the presence of the non-deterministic flag 438. In some embodiments, in generating the loss function 440, the machine learning system 410 may ignore the deterministic interpretation output 428 if the deterministic flag 434 is not present, or may ignore the non-deterministic interpretation output 430 if the non-deterministic flag 438 is not present. As described herein, the loss function 440 may represent an error of the deterministic interpretation section 424 and an error of the non-deterministic interpretation section 426. More specifically, the non-deterministic label 436 may be compared to the non-deterministic interpretation output 430 to determine the error of the non-deterministic interpretation section 426, and the deterministic label 432 may be compared to the deterministic interpretation output 428 to determine the error of the deterministic interpretation section 424. In some embodiments, the non-deterministic label 436 may be compared to the deterministic interpretation output 428 to determine the error of the deterministic interpretation section 424, and the deterministic label 432 may be compared to the non-deterministic interpretation output 430 to determine the error of the non-deterministic interpretation section 426.

The process 500 further may include refining the machine learning model based on the loss function (as at block 550). For example, the machine learning system 410 may refine the machine learning model 420 based on the loss function 440. More specifically, the machine learning system 410 may adjust weights and/or other algorithms within the deterministic interpretation section 424 and/or the non-deterministic interpretation section 426 based on the loss function 440. In some embodiments, the weights may reduce the error of the deterministic interpretation section 424 and/or the non-deterministic interpretation section 426.

The process 500 further may include identifying hydrocarbons in the seismic training input image 405 using the refined machine learning model (as at block 560). This may include determining a presence and/or an amount of hydrocarbons in the seismic training input image 405 or a seismic operational (e.g., non-training) image. This may also or instead include determining whether the hydrocarbons are in a liquid state, a gas state, or both.

The process 500 may further include generating and/or transmitting a signal to wellsite equipment (as at block 570). The signal may be generated and/or transmitted by the refined machine learning model or the computing system 600 that runs the refined machine learning model. The signal may be based upon the location of the hydrocarbons in the seismic training input image 405 (or the seismic operational image). The signal may instruct or cause the wellsite equipment to drill (e.g., steer) toward the hydrocarbons. The signal may also or instead instruct or cause the wellsite equipment to drill (e.g., steer) away from obstructions in the subterranean formation. The wellsite equipment may be or include a drilling rig 128, a drilling tool 106b, or a combination thereof.

In some embodiments, the process 500 may be repeated for the same seismic training input image 405 until the error of the deterministic interpretation section 424 and/or the non-deterministic interpretation section 426 converges towards zero and/or satisfies a threshold error. Further, the process 500 may be repeated for additional seismic training input images 405 to further develop the machine learning model 420 to interpret additional operational seismic training input images in runtime. Further, once the machine learning model 420 is trained (e.g., once the error satisfies a threshold), the machine learning model 420 may output up to two interpretations (e.g., one deterministic interpretation, and one non-deterministic interpretation).

As described herein, aspects of the present disclosure may provide a method for providing additional training data for a machine learning based algorithm so that the algorithm may be trained with fewer manually provided interpretations. As such, the amount of interpretation work required to provide training data is reduced, therefore reducing the cost of training machine learning algorithms.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 6:
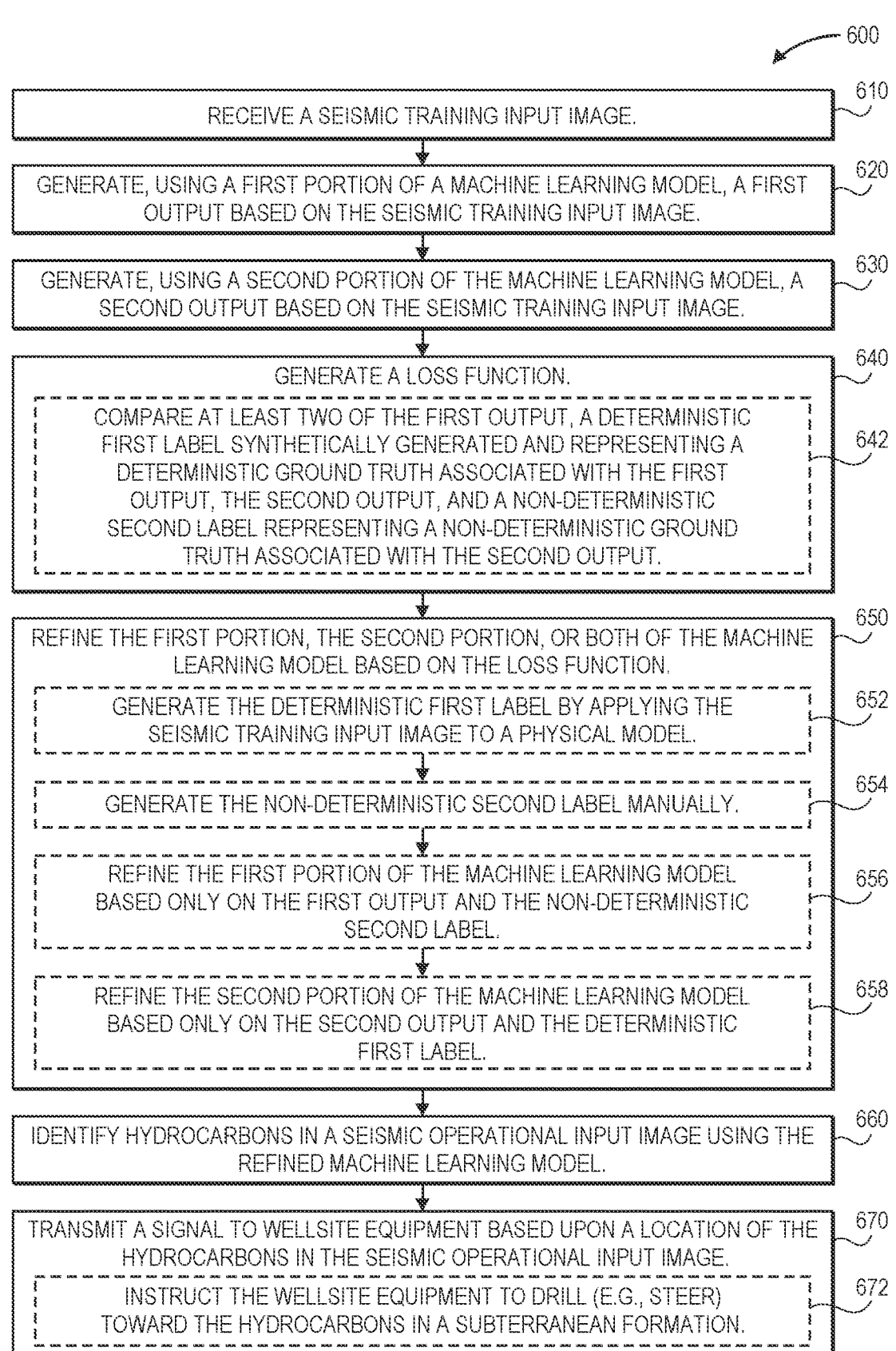
FIG. 6 illustrates a flowchart of a method for refining a model of a subterranean formation, according to an embodiment.

FIG. 6 illustrates a flowchart of a method 600 for seismic processing, according to an embodiment. More particularly, the method 600 may be used to generate a model of a subterranean formation. As used herein, "generate" may refer to creating a new model or refining a pre-existing model.

The method 600 may include receiving a seismic training input image, as at 610 (e.g., FIG. 4, reference number 405 and FIG. 5, box 510). The method 600 may also include generating, using a first portion of a machine learning model, a first output based on the seismic training input image, as at 620 (e.g., FIG. 4, box 428 and FIG. 5, box 520). The method 600 may also include generating, using a second portion of the machine learning model, a second output based on the seismic training input image, as at 630 (e.g., FIG. 4, box 430 and FIG. 5, box 530).

The method 600 may also include generating a loss function, as at 640 (e.g., FIG. 4, box 440 and FIG. 5, box 540). The loss function may be based on comparing at least two of the first output, a deterministic first label synthetically generated and representing a deterministic ground truth for the first output, the second output, and a non-deterministic second label representing a non-deterministic ground truth for the second output, as at 642.

The method 600 may also include refining the first portion, the second portion, or both of the machine learning model based on the loss function, as at 650 (e.g., FIG. 5, box 550). The first portion may be or include a deterministic portion, and the second output may be or include a non-deterministic portion. The first output may be or include a deterministic output, and the second output may be or include a non-deterministic output. The deterministic first label may be generated by applying the seismic training input image to a physical model, as at 652. The non-deterministic second label may be manually generated by a subject matter expert or interpreter, as at 654. Refining the first portion of the machine learning model may be based only on the first output and the non-deterministic second label, as at 656. Refining the second portion of the machine learning model may be based only on the second output and the deterministic first label, as at 658.

The method 600 may also include identifying hydrocarbons in a seismic operational input image using the refined machine learning model, as at 660 (e.g., FIG. 5, box 560). The method 600 may also include transmitting a signal to wellsite equipment based upon a location of the hydrocarbons in the seismic operational input image, as at 670 (e.g., FIG. 5, box 570). The signal may instruct the wellsite equipment to drill (e.g., steer) toward the hydrocarbons in a subterranean formation, as at 672.

Figure 7:
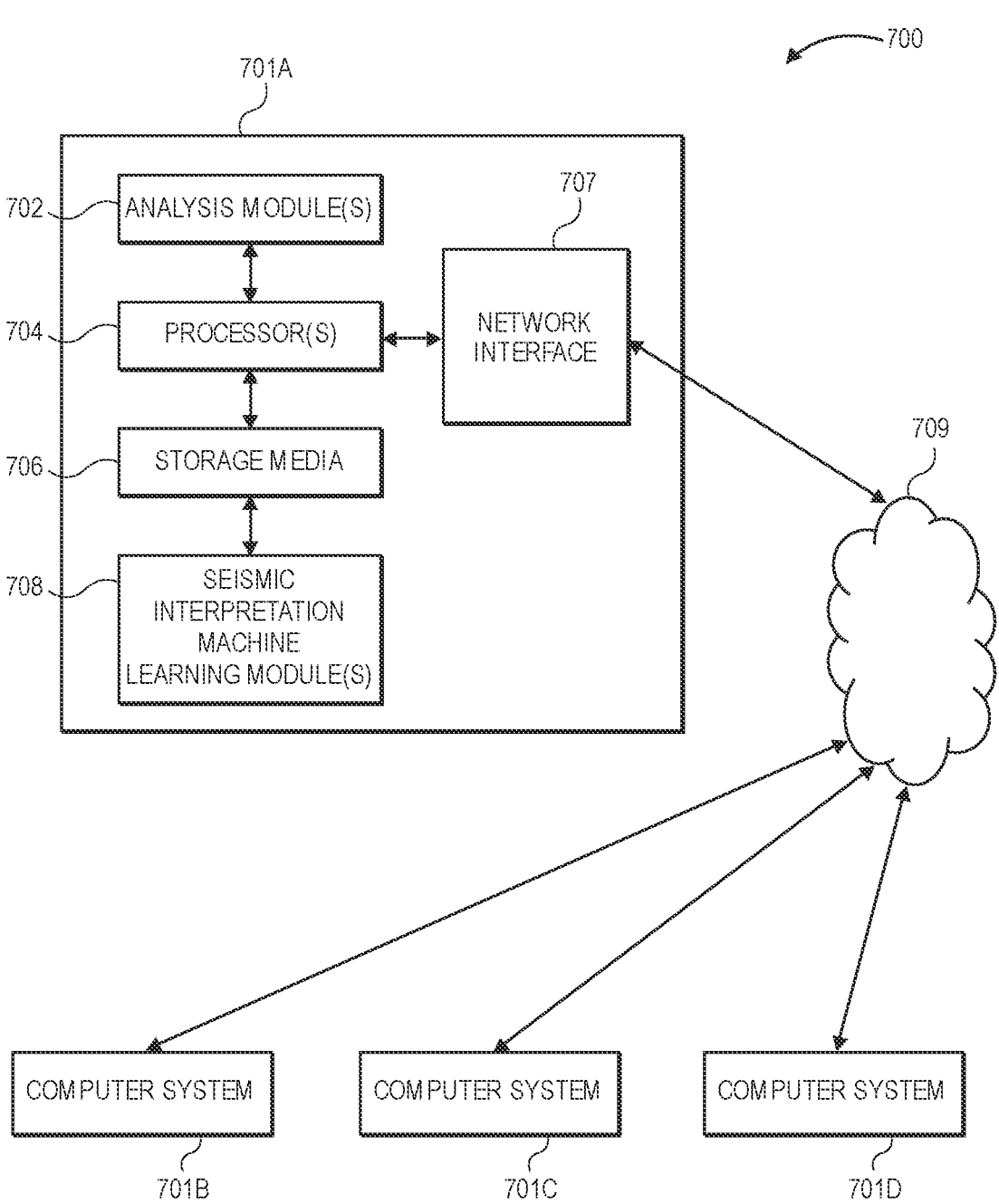
FIG. 7 illustrates a schematic view of a computing system, according to an embodiment.

In some embodiments, any of the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis module(s) 702 configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor can include a microprocessor, microcontroller, processor module or subsystem, programmable integrated circuit, programmable gate array, or another control or computing device.

The storage media 706 can be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 700 contains one or more seismic interpretation machine learning modules module(s) 708. In the example of computing system 700, computer system 701A includes the seismic interpretation machine learning modules module(s) 708. In some embodiments, a single seismic interpretation machine learning modules module 708 may be used to perform some or all aspects of one or more embodiments of the methods. In alternate embodiments, a plurality of seismic interpretation machine learning modules 708 may be used to perform some or all aspects of methods.

It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for generating a model of a subterranean formation and controlling drilling operations based on the model, the method comprising:

receiving a seismic training input image;

generating, using a first portion of a machine learning model, a first output based at least in part on the seismic training input image;

generating, using a second portion of the machine learning model, a second output based at least in part on the seismic training input image;

generating a loss function based at least in part on comparing at least two of:

the first output;

a deterministic first label synthetically generated and representing a deterministic ground truth for the first output;

the second output; and a non-deterministic second label representing a non-deterministic ground truth for the second output;

refining the first portion, the second portion, or both of the machine learning model based at least in part on the loss function by:

training the machine learning model based on deterministic first labels and non-deterministic second labels;

applying the seismic training input image to a deterministic interpretation section to obtain a deterministic interpretation output;

applying the training input to a non-interpretation section to obtain a non-deterministic output; and correcting errors in the non-deterministic output on subsequent iterations using the loss function;

generating, based on the refined first portion and the refined second portion, a plurality of geological interpretation options representing alternative models of the subterranean formation;

ranking the plurality of geological interpretation options using scores determined from outputs of the refined portions;

selecting, from among the plurality of geological interpretation options, a selected geological interpretation option;

determining, based on the selected geological interpretation option, a drilling action comprising at least one mitigating action associated with the selected geological interpretation option; and transmitting a signal to a controller to cause a drilling tool to perform the drilling action, the signal being at least one of generated or transmitted by the refined first portion, the refined second portion, or both of the machine learning model, the drilling action comprising modifying a drilling direction toward hydrocarbons or away from obstructions identified in the selected geological interpretation option.

2. The method of claim 1, wherein:

the first portion is a deterministic portion; and the second portion is a non-deterministic portion.

3. The method of claim 2, wherein:

the first output is a deterministic output; and the second portion is a non-deterministic output.

4. The method of claim 3, further comprising generating the deterministic first label by applying the seismic training input image to a physical model.

5. The method of claim 1, wherein the refining comprises adjusting a weight assigned to the first output, the deterministic first label, the second output, the non-deterministic second label, or a combination thereof based at least in part on the loss function to reduce an error of the first portion of the machine learning model, the second portion of the machine learning model, or both.

6. The method of claim 1, wherein the refining the first portion of the machine learning model is based on the first output and the non-deterministic second label, and not on the second output and the deterministic first label.

7. The method of claim 1, wherein the refining the second portion of the machine learning model is based on the second output and the deterministic first label, and not on the first output and the non-deterministic second label.

8. The method of claim 1, further comprising identifying hydrocarbons in the seismic training input image or a seismic operational input image using the refined machine learning model.

9. A computing system, comprising:

one or more processors; and a memory system comprising one or more non-transitory, computer-readable media storing instructions that, when executed by at least one of the one or more processors, cause the computing system to perform operations, the operations comprising:

receiving a seismic training input image;

generating, using a first portion of a machine learning model of a subterranean formation, a first output based at least in part on the seismic training input image;

generating, using a second portion of the machine learning model of the subterranean formation, a second output based at least in part on the seismic training input image;

generating a loss function based at least in part on comparing at least two of:

the first output;

a deterministic first label synthetically generated and representing a deterministic ground truth for the first output;

the second output; and a non-deterministic second label representing a non-deterministic ground truth for the second output;

refining the first portion, the second portion, or both of the machine learning model based at least in part on the loss function by:

training the machine learning model based on deterministic first labels and non-deterministic second labels;

applying the seismic training input image to a deterministic interpretation section to obtain a deterministic interpretation output;

applying the training input to a non-interpretation section to obtain a non-deterministic output; and correcting errors in the non-deterministic output on subsequent iterations using the loss function;

generating, based on the refined first portion and the refined second portion, a plurality of geological interpretation options representing alternative models of the subterranean formation;

ranking the plurality of geological interpretation options using scores determined from outputs of the refined portions;

selecting, from among the plurality of geological interpretation options, a selected geological interpretation option;

determining, based on the selected geological interpretation option, a drilling action comprising at least one mitigating action associated with the selected geological interpretation option; and transmitting a signal to a controller to cause a drilling tool to perform the drilling action, the signal being at least one of generated or transmitted by the refined first portion, the refined second portion, or both of the machine learning model, the drilling action comprising modifying a drilling direction toward hydrocarbons or away from obstructions identified in the selected geological interpretation option.

10. The computing system of claim 9, wherein:
the first portion is a deterministic portion; and
the second portion is a non-deterministic portion.

11. The computing system of claim 10, wherein:
the first output is a deterministic output; and
the second portion is a non-deterministic output.

12. The computing system of claim 11, wherein the deterministic first label is generated by applying the seismic training input image to a physical model.

13. The computing system of claim 9, wherein the refining comprises adjusting a weight assigned to the first output, the deterministic first label, the second output, the non-deterministic second label, or a combination thereof based at least in part on the loss function to reduce an error of the first portion of the machine learning model, the second portion of the machine learning model, or both.

14. The computing system of claim 9, wherein the refining the first portion of the machine learning model is based on the first output and the non-deterministic second label, and not on the second output and the deterministic first label.

15. The computing system of claim 9, wherein the refining the second portion of the machine learning model is based on the second output and the deterministic first label, and not on the first output and the non-deterministic second label.

16. The computing system of claim 9, wherein the operations further comprise:
identifying hydrocarbons in a seismic operational input image using the refined machine learning model; and
transmitting a signal to wellsite equipment based at least in part upon a location of the hydrocarbons in the seismic operational input image.

17. A computing system, comprising:
one or more processors; and
a memory system comprising one or more non-transitory, computer-readable media storing instructions that, when executed by at least one of the one or more processors, cause the computing system to perform operations, the operations comprising:
receiving a seismic training input image;
generating, using a first portion of a machine learning model of a subterranean formation, a first output based at least in part on the seismic training input image;
generating, using a second portion of the machine learning model of the subterranean formation, a second output based at least in part on the seismic training input image;
generating a loss function based at least in part on comparing:
the first output;
a deterministic first label synthetically generated and representing a deterministic ground truth for the first output;
the second output; and
a non-deterministic second label representing a non-deterministic ground truth for the second output;
refining the first portion and the second portion of the machine learning model based at least in part on the loss function by:
training the machine learning model based on deterministic first labels and non-deterministic second labels;
applying the seismic training input image to a deterministic interpretation section to obtain a deterministic interpretation output;

applying the training input to a non-interpretation section to obtain a non-deterministic output; and
correcting errors in the non-deterministic output on subsequent iterations using the loss function;
generating, based on the refined first portion and the refined second portion, a plurality of geological interpretation options representing alternative models of the subterranean formation;
ranking the plurality of geological interpretation options using scores determined from outputs of the refined portions;
selecting, from among the plurality of geological interpretation options, a selected geological interpretation option;
determining, based on the selected geological interpretation option, a drilling action comprising at least one mitigating action associated with the selected geological interpretation option; and
transmitting a signal to a controller to cause a drilling tool to perform the drilling action, the signal being at least one of generated or transmitted by the refined first portion, the refined second portion, or both of the machine learning model, the drilling action comprising modifying a drilling direction toward hydrocarbons or away from obstructions identified in the selected geological interpretation option.

18. The computing system of claim 17, wherein:
the first portion is a deterministic portion; and
the second portion is a non-deterministic portion.

19. The computing system of claim 18, wherein:
the first output is a deterministic output; and
the second portion is a non-deterministic output.

20. The computing system of claim 17, wherein:
the operations further comprise:
identifying hydrocarbons in a seismic operational input image using the refined machine learning model; and
transmitting a signal to wellsite equipment based at least in part upon a location of the hydrocarbons in the seismic operational input image; and
the signal instructs the wellsite equipment to drill toward the hydrocarbons in a subterranean formation.

21. The method of claim 1, further comprising:
receiving a seismic operational input image; and
updating the selected geological interpretation option based at least in part on the seismic operational input image.

22. The method of claim 1, wherein:
the refining the first portion comprises adjusting a weight corresponding to a comparison between the first output and the non-deterministic second label; and
the refining the second portion comprises adjusting a weight corresponding to a comparison between the second output and the deterministic first label.

23. The method of claim 1, wherein:
the refining the first portion and the second portion of the machine learning model based at least in part on the loss function comprises adjusting weights within a deterministic interpretation section and a non-deterministic interpretation section to reduce errors determined using a deterministic label and a non-deterministic label that is manually generated by a subject-matter expert; and
the method further comprises:
after the training, using the machine learning model to output a deterministic interpretation and a non-deterministic interpretation of a seismic operational input image;

using a feedback loop executed on an algorithmic basis at a computing device to iteratively evaluate the deterministic interpretation and the non-deterministic interpretation and to select one of the deterministic interpretation and the non-deterministic interpretation as a geological interpretation of a subterranean formation;

identifying hydrocarbons in the seismic operational input image using the selected geological interpretation; and transmitting a signal to wellsite equipment based at least in part upon a location of the hydrocarbons in the seismic operational input image to instruct the wellsite equipment to drill toward the hydrocarbons or away from obstructions in the subterranean formation.

* * * * *